Sept. 13, 1955 H. J. McCARTHY 2,717,475
METHOD OF EFFECTING A GLASS TO METAL SEAL
Filed Oct. 25, 1951 2 Sheets-Sheet 1

HENRY J. McCARTHY
*INVENTOR.*

BY *Edgar O. Rost*

*ATTORNEY*

Sept. 13, 1955  H. J. McCARTHY  2,717,475
METHOD OF EFFECTING A GLASS TO METAL SEAL
Filed Oct. 25, 1951  2 Sheets-Sheet 2

HENRY J. McCARTHY
INVENTOR.
BY *Edgar O. Lost*
ATTORNEY

United States Patent Office

2,717,475
Patented Sept. 13, 1955

2,717,475

METHOD OF EFFECTING A GLASS TO METAL SEAL

Henry J. McCarthy, Danvers, Mass., assignor to Bomac Laboratories Inc., Beverly, Mass., a corporation of Massachusetts Application October 25, 1951, Serial No. 253,039

1 Claim. (Cl. 49—81)

This invention relates to glass to metal seals, and particularly to the prevention of the formation of additional oxides at the point of the glass to metal seals.

Glass to metal seals are extensively employed in the manufacture of electronic tubes, particularly in window-sealed resonant cavities with a gas fill under reduced pressure. It is necessary that such glass to metal seals be non-porous in order to prevent leakage of air into the tube, thereby shortening tube life. It is also very important that these seals be mechanically strong, since use by the military requires that they withstand extreme variations in temperature without fracturing.

In the processing of the metal prior to sealing, it is necessary to first form a thin layer of oxide on the metal part. This oxide layer is then fused with the glass at elevated temperatures to form a bond. During this fusing process, it is very important that additional oxide be prevented from forming; otherwise, a mechanically weak, porous seal will result. In the past, various complicated and costly methods have been used to prevent the formation of excessive oxide. One such method, consists of effecting a glass to metal seal in an induction coil, enclosed in a gas chamber. First, an oxidizing atmosphere is admitted to the chamber and the metal part is heated to form a thin oxide layer. Then the glass is placed in contact with the metal and a non-oxidizing atmosphere, such as carbon-dioxide, is admitted into the chamber. The metal and glass are then heated by induction to the fusing temperature.

An object of this invention is to provide an improved glass to metal seal.

Another object is to prevent the formation of additional metal oxide during the sealing operation, in order to effect a mechanically strong, non-porous seal.

The feature of this invention is the heating of the glass and metal components to the temperature necessary for fusing within a non-oxidizing atmosphere created by means of an intense, enveloping and bushing flame.

Other objects, features and advantages will be apparent from the following detailed description of this invention, taken in conjunction with the accompanying drawings in which.

Figure 2:
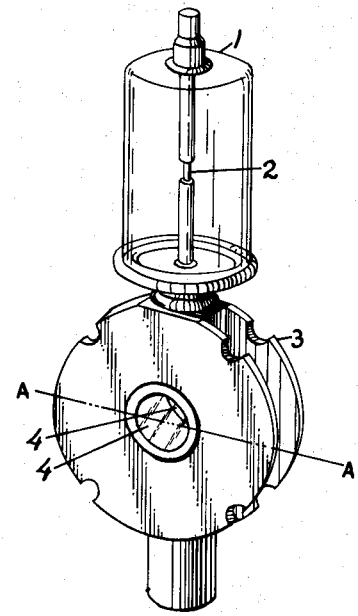
Figure 2 is a perspective view of an electronic device embodying glass to metal seals.

The invention may be applied to a number of different types of electronic tubes employing glass to metal seals. The selected electronic device as shown in Figure 2, is an ultra high frequency resonating device suitable for use as a gas switching tube, commonly referred to as a Transmit Receive (TR) tube.

The selected tube to which the invention may be applied has an envelope 3, of an electrically conductive material, enclosing a resonant chamber which is provided with a pair of resonant windows 4 through which a high frequency wave may pass into and out of the tube when coupled in a wave guide. A glass exhausting chamber 1 is sealed to the envelope 3. A keep alive electrode 2 extends from outside of the chamber 1 and communicates with the resonating chamber enclosed by the envelope.

In the specific embodiment of this invention a glass member 5 is sealed to an apertured metallic frame member 8 to form the resonant window 4. Desirably, a cobalt-nickel-iron alloy, known commercially as "Kovar," is employed for member 8.

Figure 3:
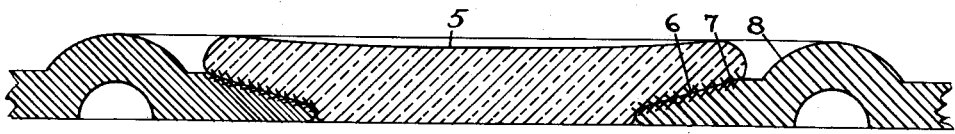
Figure 3 is an enlarged cross sectional view of a portion of the device on line A—A in Figure 2.

This seal is illustrated in Figure 3 and shows the glass as at 5, the layer of joining between the glass and the metal oxide as at 6, composed of glass and oxide, layer of joining between the oxide and the metal as at 7, composed of metal and oxide, and the metal as at 8.

Figure 1:
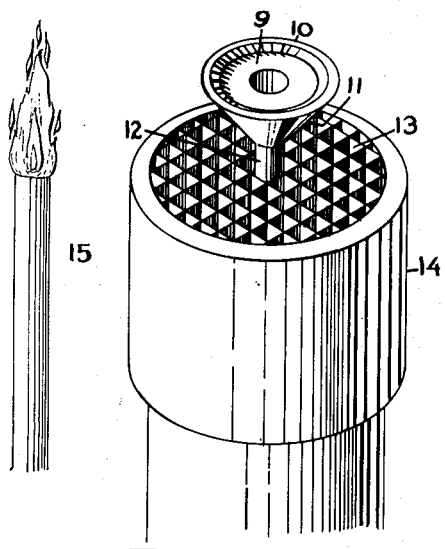
Figure 1 is a perspective view of the apparatus employed in the method of this invention.

In carrying out the method of this invention, as shown in Figure 1, a holder 9 is provided, with a raised lip 10 along its peripheral edge, tapered sides 11 and a shaft 12 at the apex of the tapered sides. Desirably the holder 9 and shaft 12 are machined from 18–8 stainless steel, however any refractory metal may be employed. The holder 9 may be machined to any desired shape to conform to the shape of the metal part and the raised lip 10 is utilized to retain the metal part on the top surface of the holder.

The holder 9 is positioned in the center of the tube 14, of a gas-fueled vertical type burner, provided with a grated orifice 13 by means of the shaft 12, which is friction fitted in the center interstice of the orifice.

Figure 5:
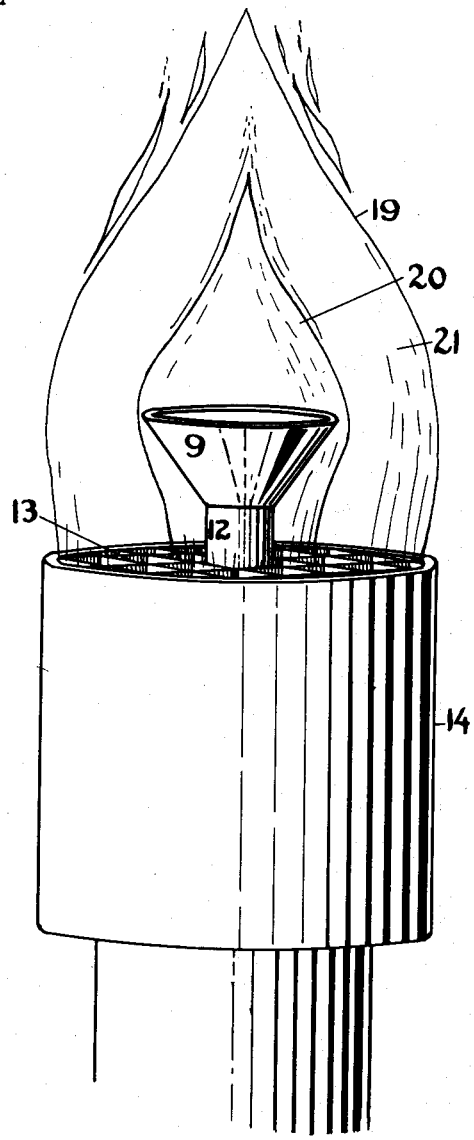
Figure 5 is a side elevation view of the apparatus employed in the method of this invention during heating.

In the preparation of the metal part prior to sealing, the commonly used methods of cleaning the metal are employed. The metal part is next coated with a thin film of oxide. In the desired embodiment of the method of this invention, the metal part is positioned on the surface of the holder 9, and burner is ignited by means of a pilot 15 or any other commonly used means. As shown in Figure 5 the intensity and height of the burner flame 19 is adjusted until the holder 9 is completely enveloped by an intense and bushing flame on all sides. The metal part is then heated in the non-oxidizing atmosphere 20 created by this flame until a bright orange-red color is attained. The oxidizing zone is indicated at 21. The burner flame is then extinguished or otherwise removed, thereby allowing the metal to cool in an oxidizing atmosphere provided by the surrounding air.

The glass part in the desired size and shape, of the material commonly used in such seals, is then positioned at the point of the desired seal. The burner flame 19 is again ignited and the glass and metal parts are heated, by the intense bushing and enveloping flame to the temperature necessary for fusing, within the non-oxidizing atmosphere 20 provided by the burner flame. As soon as the metal and glass fuse, the flame is removed and the glass to metal seal will be complete. The sealed parts may then be removed from the holder.

Figure 4:
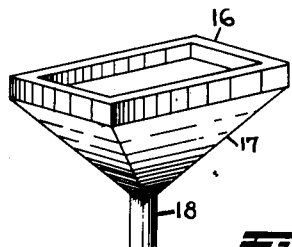
Figure 4 is a perspective enlargement of an alternative device employed in the method of this invention.

Figure 4 illustrates an alternate shape of a device for positioning the glass and metal parts in the method of this invention. This device is a right rectangular truncated inverted pyramid and is also composed of a lip 16, tapered sides 17 and a shaft 18.

Glass seals formed in accordance with this invention have proven to be properly sealed, mechanically strong and non-porous, and may be manufactured inexpensively with less skill required on the part of the operator.

Having thus described my invention, what I claim is:

A method of forming a resonant window for ultra high frequency discharge switching devices, said resonant window having an apertured metallic frame member of a cobalt-nickel-iron alloy and a glass member, comprising the steps of providing an intense bushing flame having a non-oxidizing zone, supporting the metallic frame member within the non-oxidizing zone of said flame, enveloping said supported metallic member completely within said flame, heating said supported and enveloped metallic member until red heat, cooling the heated member in air, placing said glass member in contact with said metallic member at the point of the desired seal, enveloping the contacting members completely within said flame and then heating said members in the non-oxidizing zone of said flame to a temperature necessary to fuse said members in a vacuum-tight seal.

References Cited in the file of this patent

UNITED STATES PATENTS

| | | |
|---|---|---|
| 2,207,929 | Meyer | July 16, 1940 |
| 2,279,168 | Kalischer et al. | Apr. 7, 1942 |
| 2,322,725 | Bovio | June 22, 1943 |
| 2,482,494 | Knochel et al. | Sept. 20, 1949 |
| 2,560,593 | Pask et al. | July 17, 1951 |
| 2,591,460 | Morrill | Apr. 1, 1952 |